United States Patent
Moon et al.

(10) Patent No.: US 9,797,750 B2
(45) Date of Patent: Oct. 24, 2017

(54) AREA-VARYING CAPACITIVE SENSOR, AND SELF COMPENSATION AND SIGNAL LINEARIZATION METHOD THEREOF

(75) Inventors: Won Kyu Moon, Pohang-si (KR); Daesil Kang, Pohang-si (KR)

(73) Assignee: POSTECH ACADEMY-INDUSTRY FOUNDATION, Pohang (KR)

( * ) Notice: Subject to any disclaimer, the term of this patent is extended or adjusted under 35 U.S.C. 154(b) by 546 days.

(21) Appl. No.: 13/218,604

(22) Filed: Aug. 26, 2011

(65) Prior Publication Data
US 2012/0074965 A1   Mar. 29, 2012

(30) Foreign Application Priority Data
Sep. 29, 2010 (KR) .................. 10-2010-0094466

(51) Int. Cl.
  *G01R 27/26*   (2006.01)
  *G01D 5/24*   (2006.01)
(52) U.S. Cl.
  CPC .................... *G01D 5/24* (2013.01)
(58) Field of Classification Search
  USPC .................................... 324/658–690
  See application file for complete search history.

(56) References Cited

U.S. PATENT DOCUMENTS

| | | | | |
|---|---|---|---|---|
| 4,522,517 A | * | 6/1985 | Wade ............... | B41J 19/207 340/870.37 |
| 5,194,819 A | * | 3/1993 | Briefer .............. | G01D 5/2417 324/662 |
| 2005/0092108 A1 | * | 5/2005 | Andermo ........... | G01D 5/2415 73/862.626 |

* cited by examiner

*Primary Examiner* — Vincent Q Nguyen
(74) *Attorney, Agent, or Firm* — Lex IP Meister, PLLC

(57) ABSTRACT

An area varying capacitive sensor for substantially reducing a drift and an offset without performing a complicated process by linearizing a signal while automatically compensating the offset and the drift by additionally disposing an electrode and performing a simple signal process without applying complicated signal processing to an area varying capacitive sensor having a periodic electrode, a self compensation and signal linearization method of the area varying capacitive sensor are provided. A self compensation and signal linearization method of the sensor having four electrode sets that are disposed to generate a phase difference signal of 90 degrees comprises: controlling the four electrode sets to respectively output a signal with a phase difference of 90 degrees; acquiring two signals from which common signal components including a drift and an offset are eliminated by subtracting the signals that have opposite phases from among the signals that are output by the four electrode sets; controlling peak values of the two signals from which the common signal components are eliminated to have the same size, and acquiring two signals from which absolute values are taken; and comparing sizes of the two signals from which the absolute values are taken, taking a lesser value, and acquiring a linearized triangular wave.

3 Claims, 5 Drawing Sheets

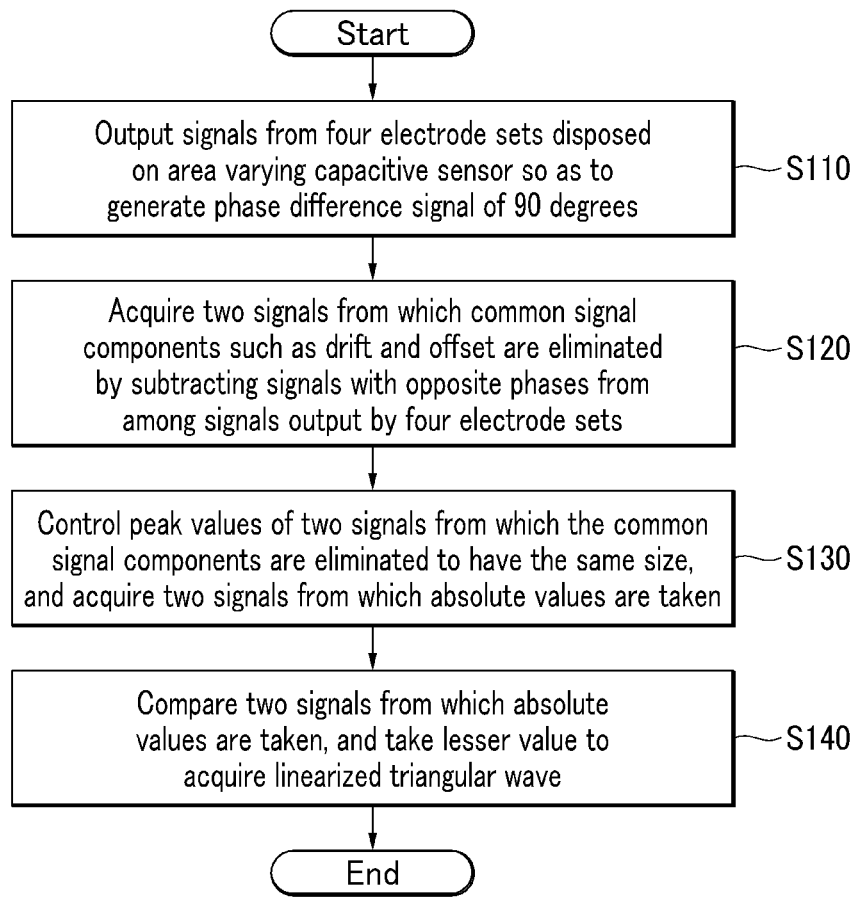

AREA-VARYING CAPACITIVE SENSOR, AND SELF COMPENSATION AND SIGNAL LINEARIZATION METHOD THEREOF

CROSS-REFERENCE TO RELATED APPLICATION

This application claims priority to and the benefit of Korean Patent Application No. 10-2010-0094466 filed in the Korean Intellectual Property Office on Sep. 29, 2010, the entire contents of which are incorporated herein by reference.

BACKGROUND OF THE INVENTION (a) Field of the Invention

An area-varying capacitive sensor for a linear encoder method, a self-compensation method of the sensor, and a signal linearization method of the sensor are provided. More particularly, the present invention relates to an area-varying capacitive sensor for a linear encoder method for automatically compensating an offset and a drift and linearizing the signal while additionally disposing an electrode and simply processing a signal without applying a complicated signal process to an area varying capacitive sensor having a periodic electrode, a self-compensation method of the sensor, and a signal linearization method of the sensor.

(b) Description of the Related Art

An output signal that is generated when an area-varying capacitive sensor having a periodic electrode is driven represents a period signal that corresponds to area change. Therefore, a displacement that corresponds to a unit like a period of the electrode can be measured by using an encoder method through a period count of a period signal and an analog signal that corresponds to a small displacement can be obtained by analyzing the signal within a period.

However, a peak and a bottom of the signal are changed in a nonlinear manner because of an edge effect of a parallel plate capacitive sensor. That is, the period signal is not an idealistic triangular wave but a triangular wave with round edges. Nonlinearity is increased by the round edges so it is difficult to calculate the accurate displacement, and the entire signal resolution is deteriorated, which must be solved. Also, the process requires automatically compensating an offset and a drift of the sensor, which has never been realized in a device level by using a simple method.

The above information disclosed in this Background section is only for enhancement of understanding of the background of the invention and therefore it may contain information that does not form the prior art that is already known in this country to a person of ordinary skill in the art.

SUMMARY OF THE INVENTION

An area varying capacitive sensor is provided for substantially reducing a drift and an offset without performing a complicated process by linearizing a signal while automatically correcting the offset and the drift by additionally disposing an electrode and performing a simple signal process without applying complicated signal processing to an area varying capacitive sensor having a periodic electrode, and acquiring a triangular wave in a continuous drive by reducing nonlinearity caused by a nonlinear signal. Also, a self compensation method of the sensor and a signal linearization method of the sensor are provided.

An area varying capacitive sensor having a periodic electrode according to an embodiment of the present invention, comprises a first electrode set disposed on the sensor and generating a reference signal, a second electrode set disposed on the sensor to generate a signal having a phase difference of 90 degrees with respect to the reference signal, a third electrode set disposed on the sensor to generate a signal having a phase difference of 180 degrees with respect to the reference signal, and a fourth electrode set disposed on the sensor to generate a signal having a phase difference of 270 degrees with respect to the reference signal.

Output signals of the first, second, third, and fourth electrode sets are the same or symmetrical except for a phase delay.

The first, second, third, and fourth electrode sets can be disposed in series.

Two of the first, second, third, and fourth electrode sets can be disposed in parallel and other two can be disposed in series.

The first, second, third, and fourth electrode sets may form combined electrodes so that two electrodes may be combined into one, and the combined electrodes can be disposed in series.

A self compensation and signal linearization method of an area varying capacitive sensor having four electrode sets that are disposed to generate a phase difference signal of 90 degrees according to another embodiment of the present invention comprise: controlling the four electrode sets to respectively output a signal with a phase difference of 90 degrees; acquiring two signals from which common signal components including a drift and an offset are eliminated by subtracting the signals that have opposite phases from among the signals that are output by the four electrode sets; controlling peak values of the two signals from which the common signal components are eliminated to have the same size, and acquiring two signals from which absolute values are taken; and comparing sizes of the two signals from which the absolute values are taken, taking a lesser value thereof, and acquiring a linearized triangular wave.

The two signals from which the common signal components are eliminated have a phase difference of 90 degrees.

A ratio of a peak value of the signal having a greater peak value versus a peak value of the signal with a lesser peak value is multiplied by the signal having a lesser peak value in order to control the peak values to have the same size.

The area varying capacitive sensor according to a linear encoder method, and a self compensation and signal linearization method of the sensor, automatically correct the offset and the drift and linearize the signal while additionally disposing the electrode and performing a simple signal process without complicated signal processing in the area varying capacitive sensor having a periodic electrode.

According to the embodiment of the present invention, the drift and the offset are reduced without a complicated process, and signal nonlinearity caused by the nonlinearity of the electrode edge is reduced to thus acquire a triangular wave in the case of continuous driving.

Further, according to the embodiment of the present invention, since the period of the final signal is reduced to be ¼ of the original period, the resolution of the encoder for counting the number of period signals can be increased to be 4 times the original resolution.

In addition, according to the embodiment of the present invention, the signal to noise ratio (SNR) can be increased by eliminating common noise and increasing the change width of the signal during the linearization process.

BRIEF DESCRIPTION OF THE DRAWINGS

FIG. 9 shows a flowchart for self compensation of an area-varying capacitive 4-electrode sensor having a periodic electrode and a signal linearization method thereof.

DETAILED DESCRIPTION OF THE EMBODIMENTS

With reference to the accompanying drawings, an exemplary embodiment of an area varying capacitive sensor having a periodic electrode, self compensation of the sensor, and a signal linearization method thereof will now be described in detail.

Figure 3:
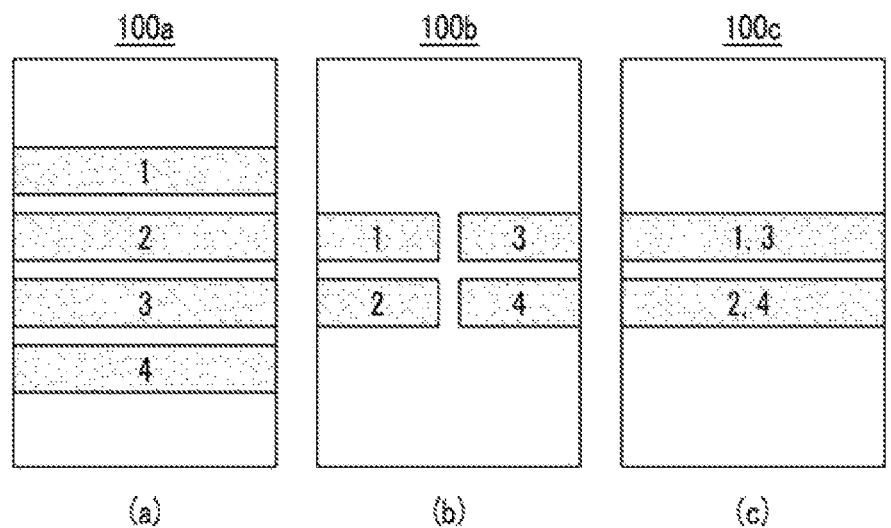
FIG. 3 (a) to (c) show schematic diagrams of an area varying capacitive sensor.
Figure 4:
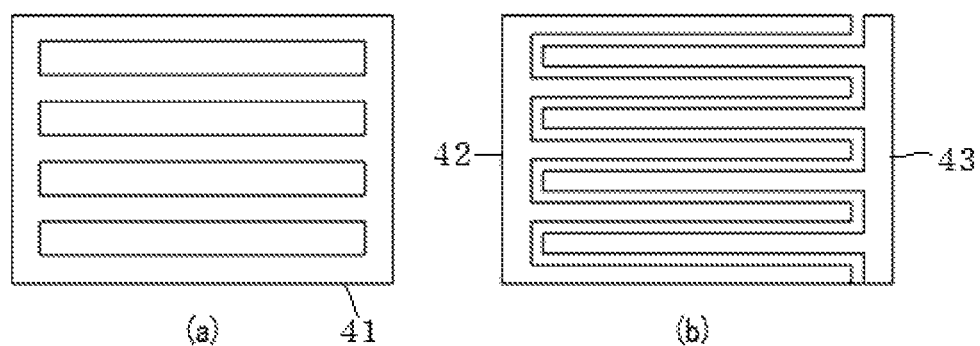
FIGS. 4 (a) and (b) show an electrode disposition diagram of an area varying capacitive sensor.

Referring to FIG. 3 and FIG. 4, the area varying capacitive sensor 100 having a periodic electrode includes: a first electrode set 1 disposed on area varying capacitive sensors 100a, 100b, and 100c and generating a reference signal; a second electrode set 2 disposed on the sensors 100a, 100b, and 100c to generate a signal having a phase difference of 90 degrees with respect to the reference signal; a third electrode set 3 disposed on the sensors 100a, 100b, and 100c to generate a signal having a phase difference of 180 degrees with respect to the reference signal; and a fourth electrode set 4 disposed on the sensors 100a, 100b, and 100c to generate a signal having a phase difference of 270 degrees with respect to the reference signal. Other parts of output signals of the first, second, third, and fourth electrode sets 1, 2, 3, and 4 except the phase delay are the same or symmetrical. The first, second, third, and fourth electrode sets 1, 2, 3, and 4 are disposed in series as shown in FIG. 3 (a), two electrode sets 1 and 3, and 2 and 4, are disposed in series and the other two electrode sets 1 and 2, and 3 and 4, are disposed in series as shown in FIG. 3 (b), or combined electrodes 1 and 3, and 2 and 4, generated by combining the two electrodes into one, are formed and the combined electrodes are disposed in series as shown in FIG. 3 (c).

Referring to FIG. 9, the self compensation and signal linearization method of the area varying capacitive sensor includes: controlling the four electrode sets 1, 2, 3, and 4 disposed on the area varying capacitive sensor 100 to output signals having the phase difference of 90 degrees so that phase difference signals with 90 degree differences may be generated (S110); acquiring two signals from which common signal components such as the drift and the offset are eliminated by subtracting the signals having the opposite phase from among the signals that are output from the four electrode sets 1, 2, 3, and 4 (S120); controlling peak values of the two signals from which the common signal components are eliminated to have the same size and take absolute values thereof and thus acquiring two signals (S130); and comparing the sizes of the two signals from which the absolute values are taken, and taking a lesser value to acquire a linearized triangular wave (S140).

An area varying capacitive sensor having a periodic electrode of a linear encoder method and a self compensation and signal linearization method of the sensor will now be described with reference to FIG. 1 to FIG. 9.

Figure 1:
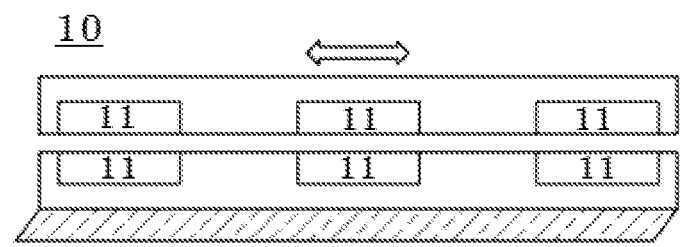
FIG. 1 shows a schematic view of an area varying capacitive sensor having a general periodic electrode.

As shown in FIG. 1, a capacitive sensor 10 is used not as a gap varying type but as an area varying type in order to use the capacitive sensor according to the embodiment of the present invention for a large displacement. The area varying capacitive sensor generally uses the encoder method by using a periodic electrode 11 so as to improve sensitivity. By using this method, the sensor is realized such that sensitivity for the displacement is improved and the large displacement is realized.

Figure 2:
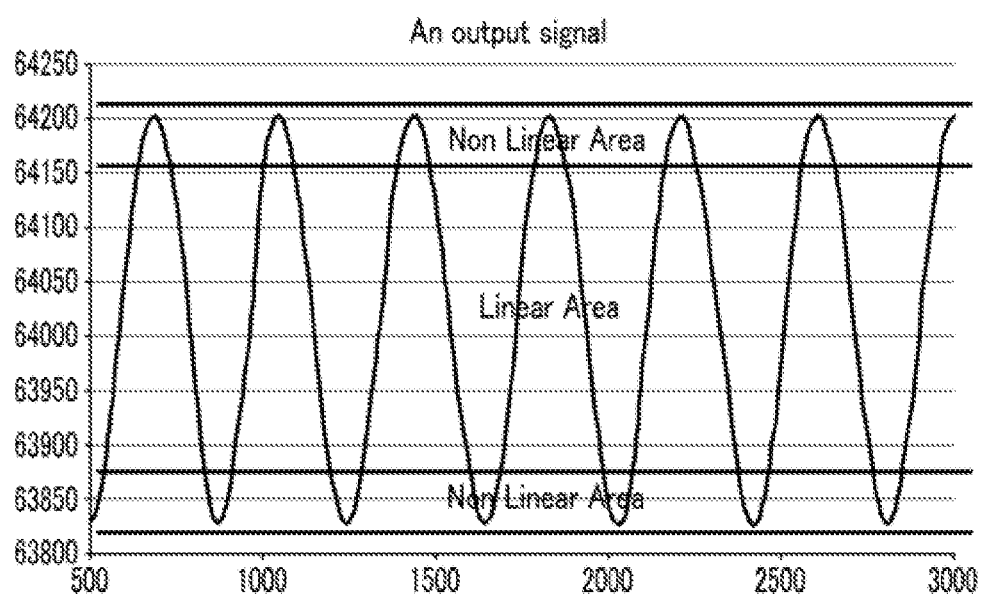
FIG. 2 shows a graph of a continuously driven signal of an area varying capacitive sensor having a periodic electrode of FIG. 1.

However, the area varying sensor cannot neglect the edge effect of the electrode, differing from the gap varying type, and when the sensor is continuously driven in one direction, a nonlinear signal is generated near the peak value as shown in FIG. 2.

As can be checked from FIG. 2, the nonlinear interval functions to deteriorate the resolution and hinders improvement of signal processing complexity of the signal outputting. It is important to generate this as a linear signal such as a triangular signal. Also, a DC value that is a fixed capacitance is provided in the capacitive sensor and the capacitive DC value works as a factor for deteriorating the resolution, and it is necessary for the capacitive DC value to be eliminated.

As shown in FIG. 3, the area varying capacitive sensors 100a, 100b, and 100c configured with four electrode sets 1, 2, 3, and 4 are used to eliminate the capacitive DC value in the existing area varying capacitive sensor and the nonlinear interval. When the respective electrode sets are called first, second, third, and fourth electrode sets 1, 2, 3, and 4, with the first electrode set 1 as a reference, the phase difference of (n−1)*90 degrees (n=2, 3, and 4) is provided between the respective electrode sets. That is, the first and third electrode sets(1, 3) and the second and fourth electrode sets(2, 4) are out of phase, and the first and second electrode sets(1, 2) and the third and fourth electrode sets(3, 4) have the phase difference of 90 degrees.

When the four electrodes are disposed, the four electrodes can be disposed in series (FIG. 3 (a)), two of them can be disposed in parallel and the other two can be disposed in series (FIG. 3 (b)), or two electrodes which are combined into one can be disposed in series (FIG. 3 (c)), depending on the size and condition of the area varying capacitive sensor.

In this instance, in a like manner of the electrode used for FIGS. 3 (a) and (b), the general electrode 41 is formed to have a shape shown in FIG. 4 (a), and when the electrodes are combined into one as shown in FIG. 3 (c), the shape of the electrodes 42, 43 can be formed to be like FIG. 4 (b).

Figure 5:
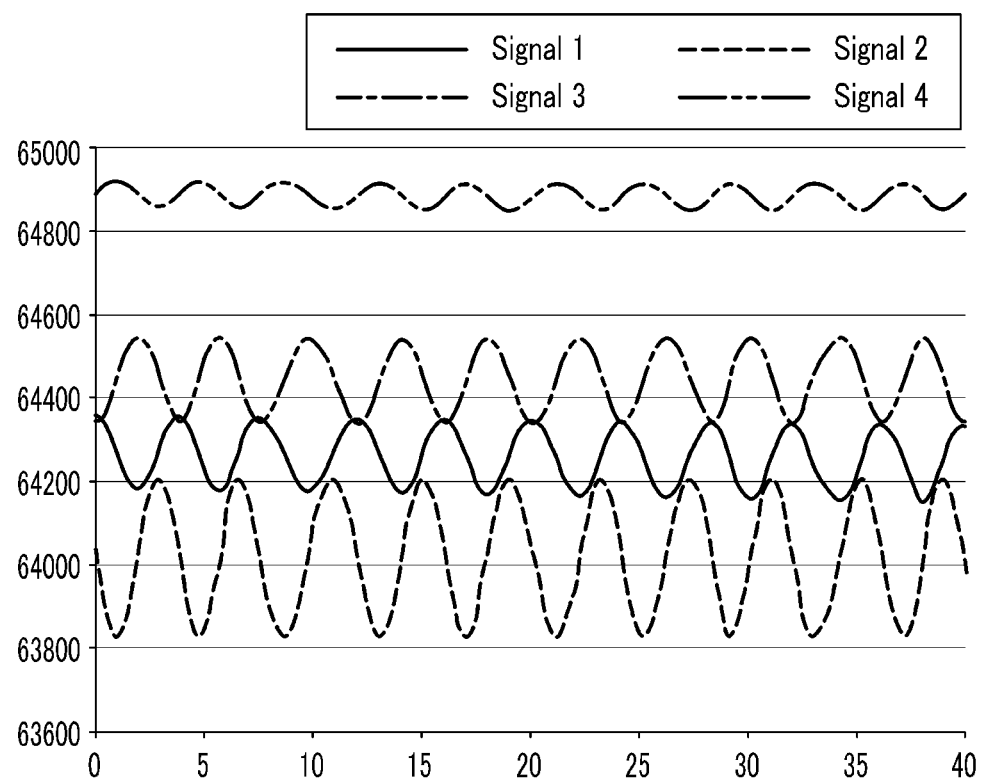
FIG. 5 shows a graph of a continuously driven signal of an area-varying capacitive 4-electrode sensor.

When an output signal is acquired from the sensor 100 using the four electrode sets 1, 2, 3, and 4, the respective signals correspond to the four signals as shown in FIG. 5 (S110). In FIG. 5, Signal1 represents a signal that is output from the first electrode set 1, Signal2 represents a signal that is output from the second electrode set, Signal3 represents a signal that is output from the third electrode set 3, and Signal4 represents a signal that is output from the fourth electrode set 4.

Figure 6:
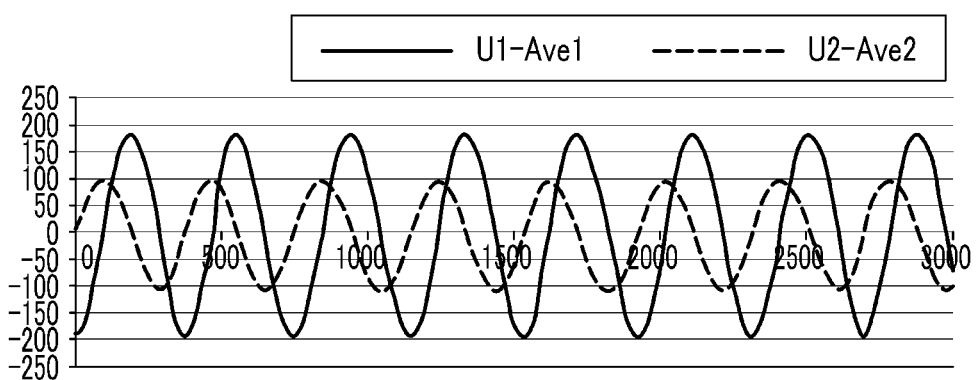
FIG. 6 shows a graph for offset-compensating a continuously driven signal of an area varying capacitive 4-electrode sensor.

Output signals of the first and third electrode sets 1 and 3 with opposite phases are subtracted from the output signals of the respective electrode sets, and output signals of the second and fourth electrode sets 2 and 4 are subtracted therefrom, such that the common value is eliminated as shown in FIG. 6, so a signal from which most of the drift and the offset are eliminated is acquired (S120). The signals (signals of FIG. 6) have a phase difference of 90 degrees.

When the phase difference shown in FIG. 6 is substantially 80 to 95 degrees while failing to be 90 degrees because of a measurement condition or a processing error of the sensor, a sum of the two signals and a difference of the two signals are used for the resulting signal. A condition of the below equation is satisfied for a general triangular function, so the amplitude is changed by the equation, and the phase difference of 90 degrees can be fulfilled.

$$\sin\theta + d_1 - \sin(\theta + \alpha) + d_2 =$$
$$\sin\theta + \sin(-\theta - \alpha) + (d_1 + d_2) = 2\sin\left(-\frac{\alpha}{2}\right)\cos\left(\theta + \frac{\alpha}{2}\right) + (d_1 + d_2)$$
$$\sin\theta + d_1 + \sin(\theta + \alpha) + d_2 = 2\sin\left(\theta + \frac{\alpha}{2}\right)\cos\left(-\frac{\alpha}{2}\right) + (d_1 + d_2)$$

A ratio of a peak value of a signal with a greater peak value and a peak value of a signal with a lesser peak value is multiplied by the signal with a lesser peak value so as to control the peak values of the two signals shown in FIG. 6 to have the same size. When an absolute value of the signal is taken, a signal shown in FIG. 7 can be acquired (S130).

Figure 7:
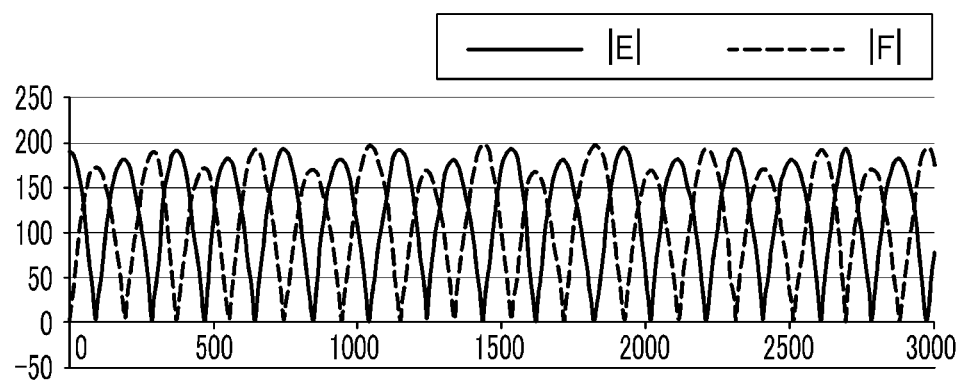
FIG. 7 shows a graph for taking an absolute value when a continuously driven signal of an area varying capacitive 4-electrode sensor is offset-compensated.
Figure 8:
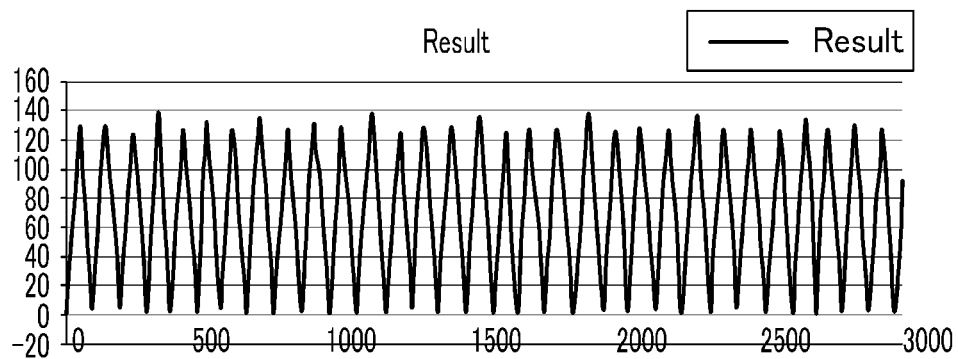
FIG. 8 shows a graph of a finally linearized signal of a continuously driven signal of an area varying capacitive 4-electrode sensor.

Two signals are compared from among the signals from which the absolute values are taken after offset compensation shown in FIG. 7, and a lesser one is taken such that a linearized signal similar to a triangular wave can be acquired as shown in FIG. 8 (S140). In FIG. 8, the peak values of the amplitude are slightly different for each period, and the differences occur periodically so there is no particularly significant problem in using them, and when the signal has superior stability, the phenomenon disappears.

Application of the area varying capacitive sensor and the self compensation and signal linearization method of the sensor will be summarized as follows.

The embodiment of the present invention uses four pairs of signals by disposing four pairs of electrode sets with different phases having phase differences of 90, 180, and 270 degrees with respect to a reference signal on the area varying capacitive sensor.

From among four pairs of electrode sets that are disposed on the area varying capacitive sensor, a pair of electrode sets that has a phase difference of 180 degrees are used to output signals with different phases to output signals with opposite phases, and the difference between the signals is used to eliminate the common signal component such as the drift or the offset, and the change width of the signal is increased. The two pairs of signals that are output in this way have a phase difference of 90 degrees, and they are changeable with respect to the center because of reduction of the offset and the drift. They are linearized by applying them in two ways according to the characteristics of the sensor signals.

The first way is to use the subsequent method when the signal is close to the triangular wave when the sensor is continuously driven and the phase difference is substantially 90 degrees. Their absolute values are taken with respect to the original point. Before taking the absolute values, it is needed to normalize the amplitude of the two signals. The two values are compared to take the lesser value, and it is made into one value.

The second way is to use the following method when the signal is close to a sine wave when the sensor is continuously driven, and the phase difference has a constant value substantially between 80 and 95 degrees. A summed signal of the two signals and a difference signal between the two signals are generated. The two signals become two new signals. The two new signals have a phase difference of 90 degrees according to the subsequent equation, and the amplitude has a difference by the ratio that corresponds to the initial phase difference.

$$\sin\theta + d_1 - \sin(\theta + \alpha) + d_2 =$$
$$\sin\theta + \sin(-\theta - \alpha) + (d_1 + d_2) = 2\sin\left(-\frac{\alpha}{2}\right)\cos\left(\theta + \frac{\alpha}{2}\right) + (d_1 + d_2)$$
$$\sin\theta + d_1 + \sin(\theta + \alpha) + d_2 = 2\sin\left(\theta + \frac{\alpha}{2}\right)\cos\left(-\frac{\alpha}{2}\right) + (d_1 + d_2)$$

In this instance, the offsets d1 and d2 becomes substantially zero because of the process in the previous stage so the sum of the two becomes substantially zero. When the amplitude of the two signals is normalized, their absolute values are taken in a like manner of the first method, and a lesser value is selected such that the linearized signal is acquired.

According to the present invention, the drift and the offset can be reduced by applying an additional disposition of electrodes and a simple signal process to the area varying capacitive sensor having a periodic electrode, and a signal in a like manner of a triangular wave when continuously driven by reducing signal nonlinearity caused by the nonlinearity of the signal on the electrode edge.

The area varying capacitive sensor has been described as an exemplary embodiment, but the present invention is not restricted thereto, and anything that corresponds to the area varying capacitive sensor will be applicable, which is manifest to a person of ordinary skill in the art.

Therefore, it will be appreciated by those skilled in the art that various modifications may be made and other equivalent embodiments are available.

Accordingly, the actual scope of the present invention must be determined by the spirit of the appended claims.

What is claimed is:

1. A self compensation and signal linearization method of an area varying capacitive displacement sensor having a first electrode set for generating a first signal, a second electrode set disposed apart from the first electrode to generate a second signal having a phase difference of 90 degree with the first signal when the capacitive displacement sensor is driven, a third electrode set disposed apart from the first and second electrode sets to generate a third signal having a phase difference of 180 degrees with the first signal when the capacitive displacement sensor is driven, and a fourth electrode set disposed apart from the first, second and third electrode sets to generate a fourth signal having a phase difference of 270 degrees with the first signal when the capacitive displacement sensor is driven, comprising:
continuously driving the capacitive displacement sensor;
acquiring a fifth signal from which common signal components including a drift and an offset are eliminated by subtracting the first and third signals;
acquiring a sixth signal from which common signal components including a drift and an offset are eliminated by subtracting the second and fourth signals;
controlling peak values of the fifth and sixth signals equally;
acquiring absolute values of the fifth and sixth whose peak values are controlled; and acquiring a linearized triangular wave by taking a lesser value of the absolute values of the fifth and sixth signals.

2. The method of claim 1, wherein the fifth and sixth signals have a phase difference of 90 degrees.

3. The method of claim 1, wherein the controlling comprises multiplying a signal having a lesser peak value among the fifth and sixth signals by a ratio of a lesser peak value to a greater peak value among the peak values of the fifth and sixth signals.

* * * * *